May 20, 1952

G. C. WILHIDE

APPARATUS FOR DRESSING VALVE SEAT GRINDING STONES FOR CONVEX VALVE SEATS

Re. 23,500

Original Filed Oct. 3, 1946

4 Sheets-Sheet 1

INVENTOR.
GLENN C. WILHIDE
BY Fay Sharpe & Fay
ATTORNEYS

May 20, 1952

G. C. WILHIDE

APPARATUS FOR DRESSING VALVE SEAT GRINDING STONES FOR CONVEX VALVE SEATS

Re. 23,500

Original Filed Oct. 3, 1946

4 Sheets-Sheet 2

INVENTOR.
GLENN C. WILHIDE
BY
Fay Goldrick & Fay
ATTORNEYS

May 20, 1952 G. C. WILHIDE Re. 23,500

APPARATUS FOR DRESSING VALVE SEAT GRINDING STONES FOR CONVEX VALVE SEATS

Original Filed Oct. 3, 1946 4 Sheets-Sheet 3

INVENTOR.
GLENN C. WILHIDE
BY Fay Jolrick & Fay
ATTORNEYS

May 20, 1952 G. C. WILHIDE Re. 23,500

APPARATUS FOR DRESSING VALVE SEAT GRINDING STONES FOR CONVEX VALVE SEATS

Original Filed Oct. 3, 1946

4 Sheets-Sheet 4

INVENTOR.
GLENN C. WILHIDE
BY Fay Golrick & Fay
ATTORNEYS

Reissued May 20, 1952

Re. 23,500

UNITED STATES PATENT OFFICE 23,500

APPARATUS FOR DRESSING VALVE SEAT GRINDING STONES FOR CONVEX VALVE SEATS

Glenn C. Wilhide, Towson, Md., assignor to The Black & Decker Manufacturing Company, Towson, Md., a corporation of Maryland Original No. 2,582,763, dated January 15, 1952, Serial No. 701,002, October 3, 1946. Application for reissue February 19, 1952, Serial No. 272,461

4 Claims. (Cl. 125—11)

Matter enclosed in heavy brackets [ ] appears in the original patent but forms no part of this reissue specification; matter printed in italics indicates the additions made by reissue.

An object of the present invention is the provision of a novel wheel dressing fixture for forming concave valve grinding surfaces to grind convex seats in internal combustion engines whereby the bevel valving surface of conventional valve members will be more readily seated and whereby the ground convex surface functions to afford a scavenging action in preventing the formation of carbon and other deposits on the valve seats of the engine block.

Another object of the present invention is the provision of a dressing tool for forming precision concave grinding surfaces on valve seat grinding stones or wheels whereby a practical means is afforded for forming convex valve seats in internal combustion engine blocks.

A further object of the present invention is the provision of a dressing tool which will form concave grinding surfaces on valve seat grinding stones, the angles of the bevels of which may vary in accordance with the variance of practice of valve designers.

A further object is the provision of a stone dressing tool for the above stated purposes which may be constructed to remain precise in operation throughout a protracted period of use in an environment of abrasive dust.

Other objects of the persent invention will be apparent from the following description of a preferred form of the invention, reference being made to the accompanying drawings wherein—

Figure 1A:
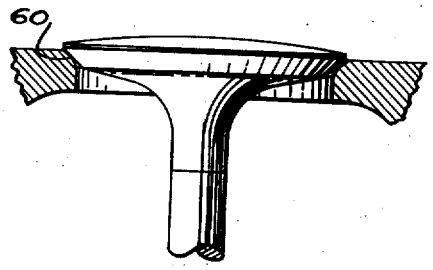
Fig. 1A is a fragmentary sectional view of a convex valve seat formation and a cooperating conventional valve head.

In the art of forming beveled or coniform valve seats at the intake and exhaust ports of an internal combustion engine block, it is the present practice to assure concentricity of the valve seat with the valve stem bore or valve stem guide of the engine block by inserting a pilot shaft in the valve stem bore of the block which serves as a precision guide for the stone. The upper end of the pilot shaft extends above the top surface of the block to afford a guiding post adapted to engage the bore of the arbor of a valve seat stone or grinding wheel. The valve seat grinding wheel has a beveled or coniform surface formed thereon which grinds precisely the valve seat. Such wheels or stones are usually mounted upon a hollow shaft having a bore corresponding to the diameter of the pilot shaft and the stone or wheel shaft is constructed in such manner as to be attached to or be driven by a portable electric motor. The bevel or coniform surface is precisely formed on the stone by a dressing tool usually in the form of a diamond point or cutter. The stone while driven by the motor is positioned on a stud shaft about which the stone is rotated while attached to the portable motor and the diamond point of the fixture is carried by an adjustable slide which can be set at the desired angle relative to the stone axis to precisely trim or cut or dress the pre-beveled surface of the stone to conform to the exact angle of the valve seat angle to be formed. Stones of various diameters are usually available to meet the need and variation in port diameters and the stones may be of varying degrees of abrasive grain refinement for both rough and finished cut, although it has been found that usually an arcuate valve seat may be formed with the desired surface finish by the use of one stone of proper grain fineness.

It is a well known problem that the necessity for valve reseating is often caused by the formation of deposits on the valve seat such as hardened carbon, and carbon and oil pounded into the valve seat by the action of the valving surface of the valve member. I have found that if a slightly convex valve seat could be formed in a practical manner the action of the coniform surface of the valve member upon such convex surface is such as to prolong the period of performance of the valve mechanism without necessitating seating or regrinding. This action is such that each time the valve member is brought down upon the convex seat by the action of the valve spring a line ring contact is made between the valve member and the convex valve seat surface and the foreign matter which tends to deposit on the valve seat is crowded away from this line contact. It is true that the line ring contact is only theoretical in actual practice, the action being such that the annular path of contact between the valve surface and the valve seat becomes widened over a period of use. In accordance with the present invention I have devised a manner of forming a concave grinding surface on the stone bevel in such a practical, simple manner as to preclude the usual inaccuracies and I have devised a fixture for carrying out the mode of such stone surface formation. The mode and apparatus are utilizable for the formation of such concave surfaces on stone, the valve angle surface of which may vary in accordance with the variation and the practice of combustion engine engineering.

I have found that by mounting the diamond upon a swinging arm the axis of swinging motion of which can be adjusted to conform with variation in the angle of valve seats will cause the diamond point to swing in an arcuate path which interrupts the normal coniform surface of revolution of the stone. The crest of the arc of the point path relative to the normal coniform surface will be substantially in a normal line bisecting the length of the coniform surface to be treated and produce a slightly concave surface. The extent of this concavity can be increased or decreased by lengthening or shortening respectively the radius of the swing of the diamond point.

Figure 1:
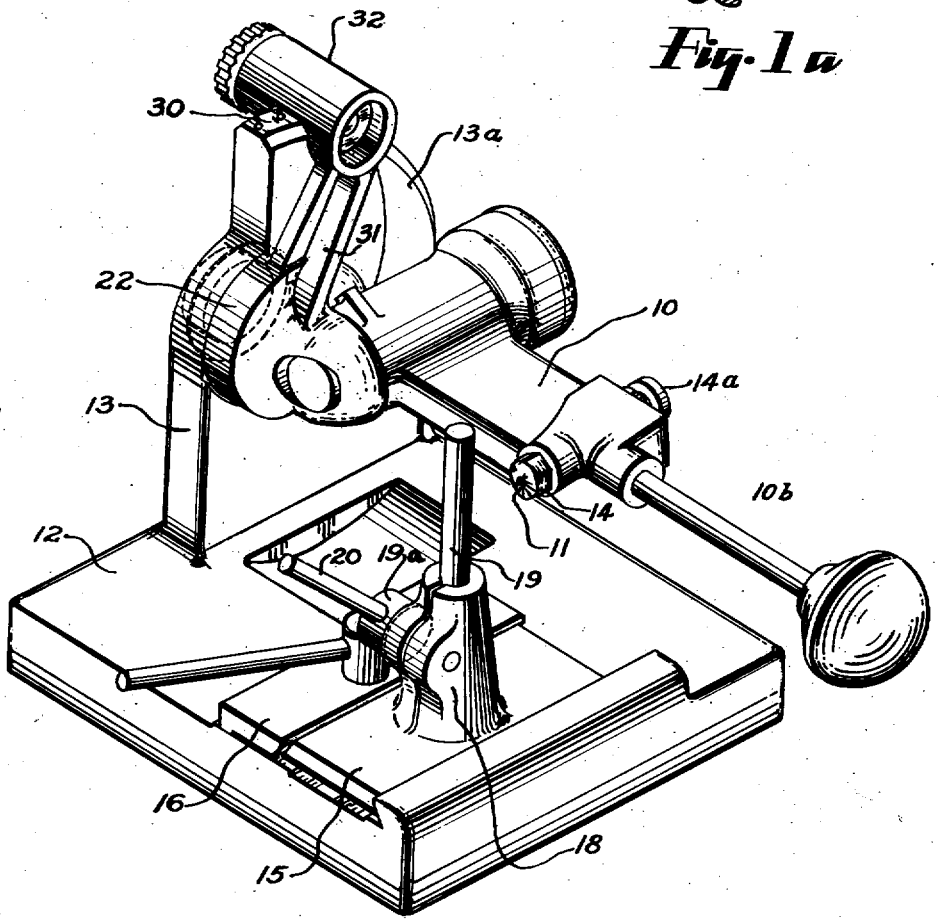
Fig. 1 is a perspective view of my apparatus for forming convex valve seats.

Referring to Fig. 1, I disclose such an apparatus wherein the swinging arm 10 carries the diamond point 11 in such an arc. The pivotal axis of the swinging arm may be disposed at various angles as will be later understood. This apparatus comprises a base formation 12 having an integral standard or vertical wall 13 upon which the arm 10 is angularly adjustably mounted as well as swingably mounted as will be described hereinafter. A manually operated rod and knob 10b is shown as a means for swinging the arm 10. The diamond has a holder 14 which may be adjusted relative to the arm by a nut 14a.

The base 12 has a slideway formation for the reception and holding of a slide member 15, there being a gib member 16 which forms one side of the slideway and also serves as a clamping means for the slide 15. Slide 15 has a pedestal 18 thereon supporting an arbor or fixed stud shaft 19 which may be clamped at any desired height by reason of the clamping structure of the pedestal comprising tightening screw 19a having a lever arm 20 for that purpose. The slideway with a stone thereon thus is adjustable toward and away from the swinging path of the diamond point depending upon the diameter of the coniform surface of the stone.

Figure 2:
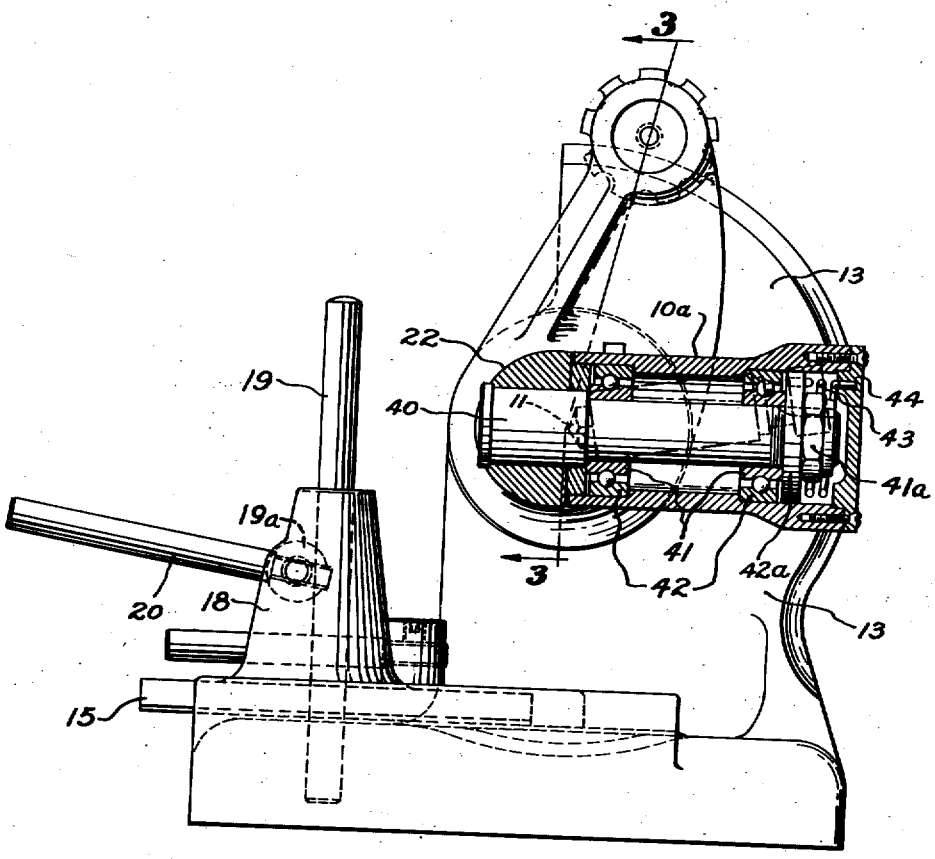
Fig. 2 is a front elevation of the apparatus shown in Fig. 1 and shown here partly in section taken along the line 2—2 of Fig. 3.
Figure 3:
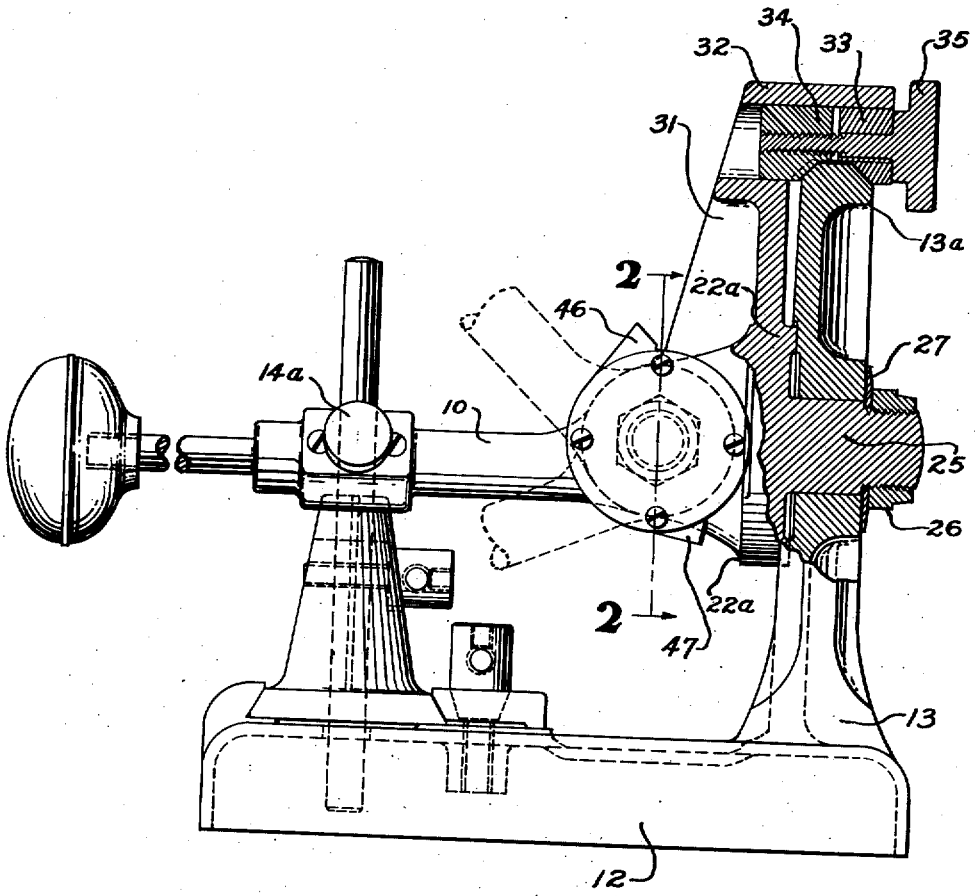
Fig. 3 is an end elevation of the apparatus shown in Fig. 1 and shown here partly in section taken along the line 3—3 of Fig. 2.

Referring to Figs. 2 and 3, it will be seen that the support or mounting for the swingable arm 10 comprises a member 22 which has a pivotal connection with the upright portion 13 of the base (see Fig. 3). This pivotal connection comprises a stud formation 25 extending into a bore formed in the upright portion 13 of the base having a threaded outer end engaged by a holding nut 26 which reacts against a spring washer 27. The member 22 has an annular track or slide formation 22a abutting a finished annular surface formed on the upright 13. The centerline or axis of the stud formation 25 extends in a direction at right angles to the slide 15 and in the present form of the invention is co-incident with the plane of swing of the cutter point.

The upright 13 has a protractor segment 13a integrally formed therewith having a graduated surface 30 calibrated in degrees through a sufficient range to include all of the angles of valve surface or slope of known practices. The *member* [manner] 22 has an upwardly extending arm 31 formed thereon terminating in a sleeve formation 32 which overhangs the calibrated surface 30 of the protractor segment. Disposed within the sleeve 32 are a clamping bushing 33 and a clamping nut 34 having inner ends thereof beveled to conform with bevels formed adjacent the protractor surface 30. A binding screw or nut 35 is in threaded engagement with the clamping nut 34 so that the arm may be swung about the axis of pivot stud 25 to any desired position along the protractor segment 13a and thus swing the member 22 and the pivotal axis of the cutter carrying arm 10 to the selected position. Hence the member 22 is of such shape as to serve as a support for the pivotal mounting of the arm 10 (see Fig. 2). To this end a stud shaft 40 is fixed in a suitable bore formed in the member 22 to have its center line extend in a plane which plane includes the axis of the pivotal structure 25. The stud shaft 40 supports spaced bearing races 41 which cooperate with races 42 and the bearing balls disposed therebetween to form a precision pivotal connection between the arm 10 and the member 22, the bearing members 42 being fixed in the sleeve formation 10a of the swingable arm 10. The outer end of stud shaft 40 is threaded to receive a retaining nut 41a which holds a spacer washer 42a in abutment to one of the inner race members 41. The spacer washer 42a is keyed or fixed to the end of the stud shaft to form an anchor for one end of a spring member 43, the outer end of the spring member being attached to a closure member 44 fixed to the end of the sleeve formation 10a of the swingable arm 10 so that the spring will tend to maintain the arm in a normally upward position. The sleeve formation 10a is provided with two stop formations 46 and 47 which limit the upward and downward swing of the arm 10 by abutting against the finished hub surface 22a of the member 22.

It will be noted in Fig. 2 that the cutting point of the diamond 11 (see dot and dash lines) is disposed co-incident with the center line of the pivotal structure 25 and that the axis of the stone stud shaft 19 is disposed vertically on slide 15. Also, it will be noted that the pivotal axis of the arm 10 may be adjusted to any angle within the limits of the protractor formation 13a by swinging the arm 31 to the desired angle indicated by the position of the marginal edge of the sleeve formation 32 along the graduated surface 30. Such angular displacement of the swingable arm 10 however does not displace the cutting point 11 in its relation to the axis of the stud formation 25. Hence, regardless of such angular adjustment a swinging movement of the cutting point 11 will always have a point in its arcuate path which will become substantially co-incident with the center line of the arm 31 and such point will always correspond to the lowest point in the concave surface to be formed relative to the normal beveled surface of the grinding or cutting stone. Some limited adjustment of the diamond holder relative to the arm is provided so that successive cuts may be taken on the stone without further adjustment of the initial position of the slide 15.

Figure 4:
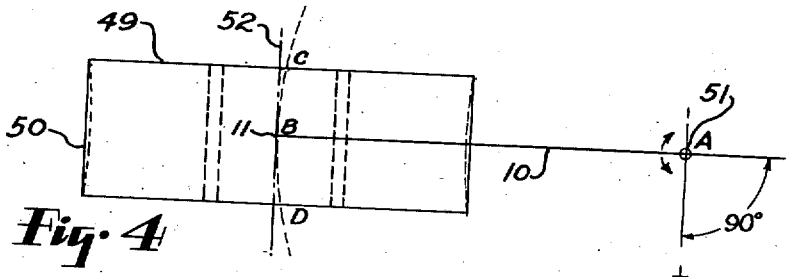
Figs. 4, 5 and 6 are descriptive diagrams of my method of forming a concave valve seat forming surface on a valve grinding wheel or stone.
Figure 5:
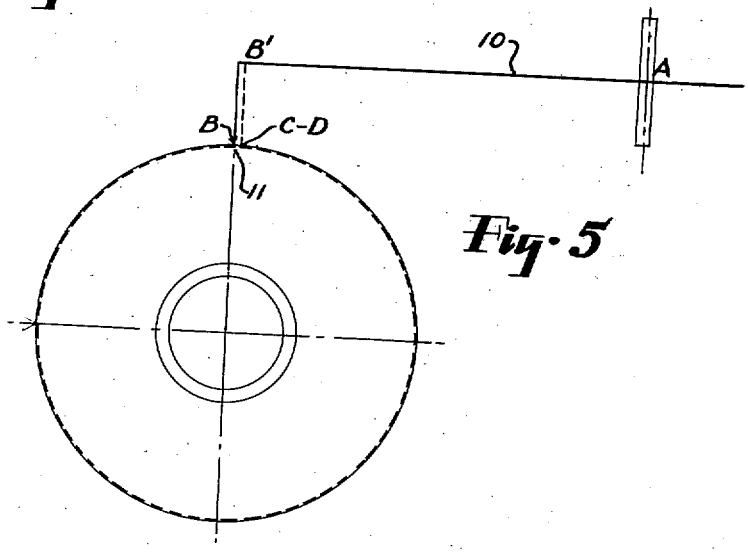

In Figs. 4 and 5, a diagrammatic representation of a stone 49 with a cylindrical surface 50 is shown. The pivotal axis 51 of arm 10 (point A) is disposed in a horizontal plane and the axis 52 of stone 49 in a vertical plane. The plane of arm axis 51 bisects cylindrical surface 50. Diamond point 11 at position B is tangent to cylindrical surface 50 and swinging of the arm would effect no cutting of the stone. As diamond point 11 is adjusted or fed toward the axis 52 of wheel 49 swinging movement of arm 10 will cause the diamond point to disrupt the cylindrical surface 50 and form the concave surface C—B—D. It is obvious that decreasing the swinging radius of the diamond point will increase the concavity of the stone surface and increasing the radius will decrease the degree of concavity.

Figure 6:
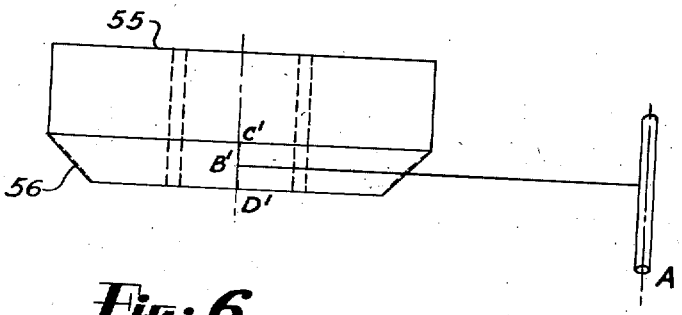

In Fig. 6 the axis A of the arm is swung 45° from the horizontal position shown in Figs. 4 and 5 and a stone with a beveled or 45° coniform surface is shown. Relative feeding movement between the stone and diamond point and swinging of the point will effect the concave surface formation C′—B′—D′. The use of the stone in the reseater mechanism hereinbefore referred to will produce the convex valve seat 60 (see Fig. 1A) for the purpose stated.

It will be understood by those skilled in the art that concave surfaces can be formed on the stone which need not be symmetrical relative to the normal beveled surface of the stone. For example the high point of the convex valve seat to be formed may be above or below the median point of the heretofore normal beveled valve seat. This may be brought about by properly determining the initial vertical position on pedestal 18 or stud 19 of the stone to thereby dispose the beveled surface thereof above or below the point of maximum depth of cut of the swinging diamond point.

The simplest mode and form of the invention has been disclosed herein but it will be apparent that the principles may be adapted to the formation of concave grinding surfaces on other forms of grinding wheels which are utilized for other production purposes.

I claim.

1. A valve seat grinding wheel dresser comprising a base structure having a vertical extension, a member pivotally mounted to said extension with the pivot axis horizontal, said member being adapted to be clamped with respect to said extension in a selected position, a pivot shaft carried by said member with its axis intersecting at right angles the pivot axis of said member, a horizontal slideway on the base, a slide in the slideway, the direction of movement of said slide being at right angles to the direction of the pivot axis of said member, vertical spindle means on the slide for rotatively supporting a grinding wheel, said spindle means being vertically adjustable to determine the wheel height, and an arm carrying a wheel dressing point intermediate its ends and having one end pivotally carried by said pivot shaft with the other end free to be manually swung about said pivot shaft whereby said wheel dressing point may be swung in an arc across the grinding wheel.

2. A valve seat grinding wheel dresser comprising a base structure having a vertical extension, a member pivotally mounted to said extension with the pivot axis horizontal, said member being adapted to be clamped with respect to said *extension* [etxension] in a selected position, a pivot shaft carried by said member with its axis intersecting at right angles the pivot axis of said member, a horizontal slideway on the base, a slide in the slideway, the direction of movement of said slide being at right angles to the direction of the pivot axis of said member, vertical spindle means on the slide for rotatively supporting a grinding wheel, said spindle means being vertically adjustable to determine the wheel height, an arm carrying a wheel dressing point intermediate its ends and having one end pivotally carried by said pivot shaft with the other end free to be manually swung about said pivot shaft whereby said wheel dressing point may be swung in an arc across the grinding wheel, and torsion spring means linking the arm and shaft to return the arm to horizontal position after manual release.

3. A valve seat grinding wheel dresser comprising a base structure having a vertical extension, a member pivotally mounted to said extension with the pivot axis horizontal, said member being adapted to be clamped with respect to said extension in a selected position, a pivot shaft carried by said member with its axis intersecting at right angles the pivot axis of said member, a horizontal slideway on the base, a slide in the slideway, the direction of movement of said slide being at right angles to the direction of the pivot axis of said member, vertical spindle means on the slide for rotatively supporting a grinding wheel, said spindle means being vertically adjustable to determine the wheel height, and an arm carrying a wheel dressing point intermediate its ends and having one end pivotally carried by said pivot shaft with the other end free to be manually swung about said pivot shaft whereby said wheel dressing point may be swung in an arc across the grinding wheel, said arm being provided with precision rolling bearing means enclosed within its pivot end for said pivot shaft.

4. A valve seat grinding wheel dresser comprising a base structure having a vertical extension, a member pivotally mounted to said extension with the pivot axis horizontal, said member being adapted to be clamped with respect to said extension in a selected position, a pivot shaft carried by said member with its axis intersecting at right angles the pivot axis of said member, a horizontal slideway on the base, a slide in the slideway, the direction of movement of said slide being at right angles to the direction of the pivot axis of said member, vertical spindle means on the slide for rotatively supporting a grinding wheel, said spindle means being vertically adjustable to determine the wheel height, an arm carrying a wheel dressing point intermediate its ends and having one end pivotally carried by said pivot shaft with the other end free to be manually swung about said pivot shaft whereby said wheel dressing point may be swung in an arc across the grinding wheel, said arm being provided with precision rolling bearing means enclosed within its pivot end for said pivot shaft, and torsion spring means linking the arm *and* [end] shaft to return the arm to horizontal position after manual release.

GLENN C. WILHIDE.

(References on following page)

REFERENCES CITED

The following references are of record in the file of this patent or the original patent:

UNITED STATES PATENTS

| Number | Name | Date |
|---|---|---|
| 945,466 | Landis | Jan. 4, 1910 |
| 1,143,337 | Walling | June 13, 1915 |
| 1,266,707 | Olson | May 21, 1918 |
| 1,536,209 | Green | May 5, 1925 |
| 1,585,706 | Hanson | May 25, 1926 |

| Number | Name | Date |
|---|---|---|
| 1,626,232 | Gargarin | Apr. 26, 1927 |
| 1,635,463 | Davis | July 12, 1927 |
| 1,997,862 | Halborg et al. | Apr. 16, 1935 |
| 1,999,435 | Albertson | Apr. 30, 1935 |
| 2,127,614 | Parker | Aug. 23, 1938 |
| 2,183,759 | Wildhaber | Dec. 19, 1939 |
| 2,327,272 | Jones | Aug. 17, 1943 |
| 2,366,623 | Jakobsen | Jan. 2, 1945 |
| 2,398,451 | Schantz | Apr. 16, 1946 |
| 2,429,464 | Jearum | Oct. 31, 1947 |